United States Patent
Maruyama

(10) Patent No.: US 10,422,948 B2
(45) Date of Patent: Sep. 24, 2019

(54) OPTICAL FIBER AND METHOD OF MANUFACTURING THE SAME

(71) Applicant: FUJIKURA LTD., Tokyo (JP)

(72) Inventor: Ryo Maruyama, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/877,697

(22) Filed: Jan. 23, 2018

(65) Prior Publication Data

US 2019/0025503 A1    Jan. 24, 2019

Related U.S. Application Data

(60) Provisional application No. 62/533,671, filed on Jul. 18, 2017.

(51) Int. Cl.
| | |
|---|---|
| *G02B 6/036* | (2006.01) |
| *G02B 6/02* | (2006.01) |
| *G02B 6/028* | (2006.01) |

(52) U.S. Cl.
CPC ..... *G02B 6/03627* (2013.01); *G02B 6/02009* (2013.01); *G02B 6/0281* (2013.01)

(58) Field of Classification Search
CPC .......................... G02B 6/03627; G02B 6/0281
See application file for complete search history.

(56) References Cited

U.S. PATENT DOCUMENTS

| | | | |
|---|---|---|---|
| 8,135,255 B2 * | 3/2012 | Oyamada et al. | G02B 6/03627 385/126 |
| 8,891,925 B2 | 11/2014 | Bickham et al. | |
| 9,188,736 B2 * | 11/2015 | Mishra | G02B 6/02 |
| 9,772,444 B2 * | 9/2017 | Kitamura | G02B 6/02004 |

FOREIGN PATENT DOCUMENTS

| | | |
|---|---|---|
| EP | 3185056 A1 | 6/2017 |
| WO | 2016/047749 A1 | 3/2016 |

OTHER PUBLICATIONS

International Telecommunication Union Telecommunication Standardization Sector (ITU-T), "Series G: Transmission Systems and Media, Digital Systems and Networks," G.657, dated Nov. 2016 (24 pages).

(Continued)

*Primary Examiner* — Omar R Rojas
(74) *Attorney, Agent, or Firm* — Osha Liang LLP

(57) ABSTRACT

An optical fiber includes a core, a depressed layer surrounding the core, and a cladding surrounding the depressed layer, where a refractive index profile of the core is an α power distribution in which an index α is 3 or more and 6 or less, a relative refractive index difference $\Delta^-$ of the depressed layer with respect to the adding is set such that an absolute value $|\Delta^-|$ thereof is 0.01% or more and 0.05% or less, a radius r1 of the core and an outer circumference radius r2 of the depressed layer are set such that a ratio r1/r2 thereof is 0.2 or more and 0.5 or less, a cable cutoff wavelength $\lambda_{cc}$ of 22 m is 1260 nm or less, and a mode field diameter MFD at a wavelength of 1310 nm is 8.6 μm or more and 9.5 μm or less.

10 Claims, 4 Drawing Sheets

(56) References Cited

OTHER PUBLICATIONS

Izawa, T. et al., "Research and Development of Vapor-phase Axial Deposition method (VAD method)," [online], Japan Society for the Promotion of Science, National Institute of Informatics, accessed Jun. 26, 2017, http://dbnst.nii.ac.jp/pro/detail/511 (2 pages).
Kagata et al., 2, 3 NTT Technical Journal, p. 94-99, Sep. 2015 (6 pages).
Fujikura News, No. 408, 2015.7 (3 pages).
Okubo, Katsuhiko, "Optical Fiber Technology in the ISDN Era," p. 2-10 to 2-20, Rikogakusha Publishing Co., Ltd., 1989 (10 pages).
Jeunhomme, L. B., "Single-Mode Fiber Optics Principles and Applications Second Edition, Revised and Expanded," Marcel Dekker, Inc., New York and Basel, p. 39-44, 1990 (14 pages).
International Telecommunication Union Telecommunication Standardization Sector (ITU-T), "Series G: Transmission Systems and Media, Digital Systems and Networks," G.650.1, dated Jul. 2010 (76 pages).
International Telecommunication Union Telecommunication Standardization Sector (ITU-T), "Series G: Transmission Systems and Media, Digital Systems and Networks," G.652, dated Nov. 2016 (28 pages).
International Telecommunication Union Telecommunication Standardization Sector (ITU-T), "Transmission Media Characteristics: Definition and Test Methods for the Relevant Parameters of Single-Mode Fibres," G.650, dated Mar. 1993 (52 pages).
Office Action issued in related U.S. Appl. No. 16/037,186 dated Mar. 8, 2019 (9 pages).
C.D.Hussey et al.; "Theory of the profile-moments description of single-mode fibres"; IEE Proceedings, vol. 129, No. 3, pp. 123-134; Jun. 1982 (12 pages).
J.M. Senior, "Optical Fiber Communications Principles and Practice"; Third Edition, ch. 2, pp. 54-57; Pearson Education; 2009 (5 pages).

* cited by examiner (a)

(b)

(c)

OPTICAL FIBER AND METHOD OF MANUFACTURING THE SAME

Priority is claimed on U.S. Patent Application No. 62/533,671, provisionally filed Jul. 18, 2017, the content of which is incorporated herein by reference.

BACKGROUND

Field of the Invention

The present invention relates to an optical fiber including a depressed layer between a core and a cladding. Further, the present invention relates to a manufacturing method of manufacturing such an optical fiber.

PCT International Publication No. 2016/047749 pamphlet (published on Mar. 31, 2016; hereinafter referred to as Patent Document 1) discloses an optical fiber including a depressed layer between a core and a cladding. Patent Document 1 describes that an optical fiber can be realized having a bending loss that satisfies the International Telecommunication Union Telecommunication Standardization Sector (ITU-T) Recommendation G.657.A1, which is an international standard for optical fibers, while maintaining a mode field diameter and limiting a connection loss with a general-purpose optical fiber to a small value, by optimizing a relative refractive index difference $\Delta^-$ of the depressed layer with respect to the cladding and optimizing a ratio r1/r2 of a radius r1 of the core to an outer circumference radius r2 of the depressed layer.

A mode field diameter (MFD) is represented by a definition formula (the following formula (1)) of Petermann II in the ITU-T Recommendation G.650.1. Here, E(r) indicates the electric field intensity at a point to which the distance from a central axis of the optical fiber is r.

$$MFD = 2w = 2\sqrt{\frac{2\int_0^\infty E^2(r)rdr}{\int_0^\infty [dE(r)/dr]^2 rdr}} \quad (1)$$

Further, the bending loss indicates an increase in loss when an optical fiber is wound around a mandrel or the like having a predetermined radius.

Incidentally, in an optical fiber, it is necessary to consider dispersion characteristics in addition to the connection loss and the bending loss. For example, in the ITU-T Recommendation G.652, it is recommended that a zero dispersion wavelength ZDW be 1300 nm or more and 1324 nm or less and that a zero dispersion slope be 0.073 ps/km/nm$^2$ or more and 0.092 ps/km/nm$^2$ or less. Therefore, in consideration of manufacturing variation, it is required to design an optical fiber in which the zero dispersion wavelength is 1305 nm or more and 1319 nm or less.

However, an optical fiber including a depressed layer tends to have a zero dispersion wavelength less than that of an optical fiber including no depressed layer. In the optical fiber described in Patent Document 1, the zero dispersion wavelength may be less than 1305 nm. Therefore, in the optical fiber described in Patent Document 1, there remains room for improvement in the dispersion characteristics.

The zero dispersion wavelength denotes a wavelength at which the value of chromatic dispersion becomes zero. Here, the chromatic dispersion is the sum of material dispersion and waveguide dispersion. Further, the zero dispersion slope denotes a change rate of the chromatic dispersion with respect to a wavelength at the zero dispersion wavelength.

One or more embodiments of the present invention may improve dispersion characteristics while obtaining both of low connection loss and low bending loss in an optical fiber having a depressed layer.

SUMMARY

A first aspect of one or more embodiments of the present invention is an optical fiber including a core, a depressed layer surrounding the core, and a cladding surrounding the depressed layer, wherein a refractive index profile of the core is an α power distribution in which an index α is 3 or more and 6 or less, a relative refractive index difference $\Delta^-$ of the depressed layer with respect to the adding is set such that an absolute value $|\Delta^-|$ thereof is 0.01% or more and 0.05% or less, a radius r1 of the core and an outer circumference radius r2 of the depressed layer are set such that a ratio r1/r2 thereof is 0.2 or more and 0.5 or less, a cable cutoff wavelength $\lambda_{cc}$ of 22 m is 1260 nm or less, and a mode field diameter MFD at a wavelength of 1310 nm is 8.6 μm or more and 9.5 μm or less.

A second aspect of one or more embodiments of the present invention is that in the optical fiber of the first aspect, the relative refractive index difference $\Delta^-$ is set such that the absolute value $|\Delta^-|$ thereof is 0.01% or more and 0.03% or less.

A third aspect of one or more embodiments of the present invention is that in the optical fiber of the first or second aspect, the radius r1 and the outer circumference radius r2 are set such that the ratio r1/r2 thereof is 0.25 or more and 0.45 or less.

A fourth aspect of one or more embodiments of the present invention is that in the optical fiber of one of the first to third aspects, a relative refractive index difference $\Delta^+$ of the core with respect to the cladding is set to be 0.30% or more and 0.45% or less.

A fifth aspect of one or more embodiments of the present invention is that in the optical fiber of one of the first to fourth aspects, a zero dispersion wavelength ZDW is 1305 μm or more.

A sixth aspect of one or more embodiments of the present invention is that in the optical fiber of the fifth aspect, the zero dispersion wavelength ZDW is 1307 μm or more.

A seventh aspect of one or more embodiments of the present invention is that in the optical fiber of one of the first to sixth aspects, the mode field diameter MFD is 8.8 μm or more and 9.4 μm or less.

A eighth aspect of one or more embodiments of the present invention is that in the optical fiber of one of the first to seventh aspects, (1) an increase in loss at a wavelength of 1550 nm when the optical fiber is wound around a cylindrical mandrel having a radius of 10 mm is less than 0.75 dB/turn, (2) an increase in loss at a wavelength of 1625 nm when the optical fiber is wound around a cylindrical mandrel having a radius of 10 mm is less than 1.5 dB/turn, (3) an increase in loss at a wavelength of 1550 nm when the optical fiber is wound around a cylindrical mandrel having a radius of 15 mm is less than 0.25 dB/10 turn, and (4) an increase in loss at a wavelength of 1625 nm when the optical fiber is wound around a cylindrical mandrel having a radius of 15 mm is less than 1.0 dB/10 turn.

A ninth aspect of one or more embodiments of the present invention is a method of manufacturing the optical fiber of one of the first to eighth aspects, the method including the step of manufacturing a preform for the optical fiber through a vapor-phase axial deposition (VAD) method.

According to one or more embodiments of the present invention, it is possible to improve dispersion characteristics while obtaining both of low connection loss and low bending loss.

DETAILED DESCRIPTION (Structure of Optical Fiber)

Figure 1:
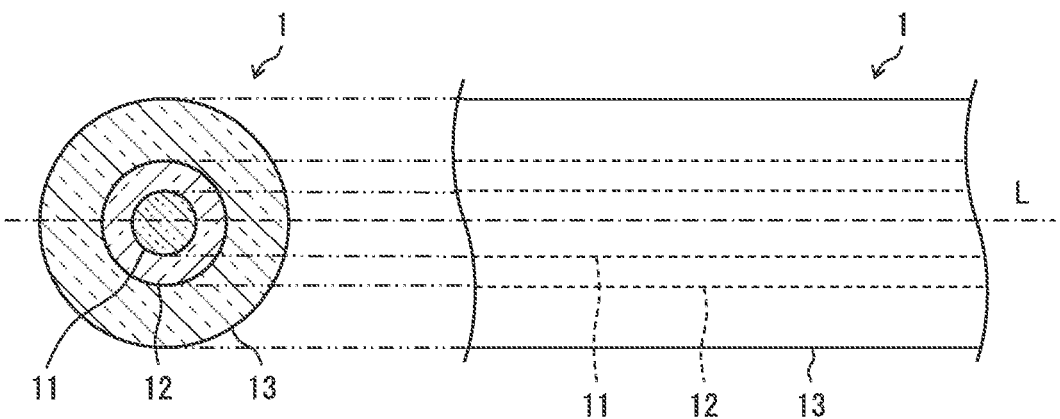
FIG. 1 is a view showing a structure of an optical fiber of one or more embodiments of the present invention. The portion (a) of FIG. 1 is a cross-sectional view (left side) and a side view (right side) showing the structure of the optical fiber, and the portion (b) of FIG. 1 is a graph showing a refractive index profile of the optical fiber.
Figure 1:
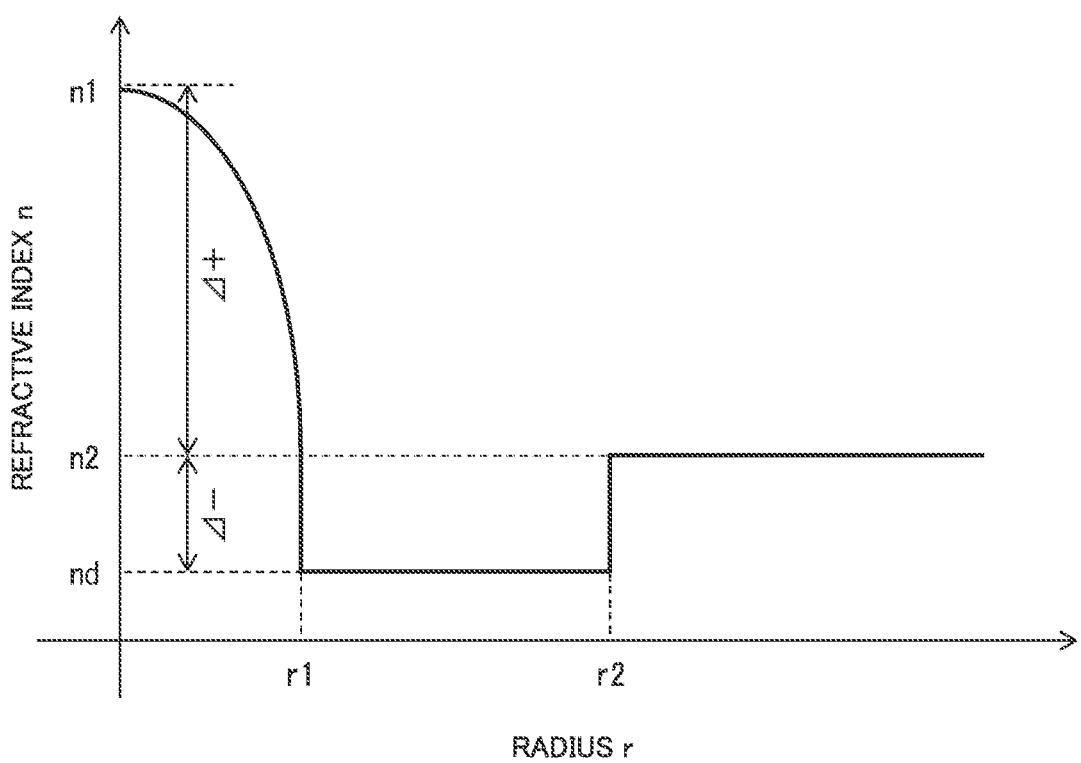

A structure of an optical fiber 1 of one or more embodiments of the present invention is described with reference to FIG. 1. In FIG. 1, the portion (a) thereof is a cross-sectional view (left side) and a side view (right side) of the optical fiber 1, and the portion (b) thereof is a graph showing a refractive index profile of the optical fiber 1. A cross-sectional structure shown in the portion (a) of FIG. 1 is common to cross-sections of the optical fiber 1 orthogonal to a central axis L of the optical fiber 1.

The optical fiber 1 is a columnar structure containing silica glass as a main component, and as shown in the portion (a) of FIG. 1, includes a core 11 having a circular cross-section (having a radius r1), a depressed layer 12 having an annular cross-section (having an inner circumference radius r1 and an outer circumference radius r2) surrounding the core 11, and a cladding 13 having an annular cross-section (having an inner circumference radius r2 and an outer circumference radius r3) surrounding the depressed layer 12. The core 11 is an area to which an up-dopant such as germanium is added and which has a refractive index higher than that of the cladding 13, and the depressed layer 12 is an area to which a down-dopant such as fluorine is added and which has a refractive index lower than that of the cladding 13.

As shown in the portion (b) of FIG. 1, the refractive index of the core 11 is approximated by an α power distribution. In other words, in the core 11, the refractive index n(r) at a point to which the distance from the central axis L is r is approximated by $n(r)=n1[1-2\Delta^+(r/r1)^\alpha]^{1/2}$. Here, n1 represents the refractive index on the central axis L, and $\Delta^+$ represents the relative refractive index difference of the core 11 with respect to the cladding 13. In addition, when α is increased, the α power distribution gradually approaches a step-type refractive index profile in which the refractive index is constant.

As shown in the portion (b) of FIG. 1, the refractive index of the depressed layer 12 is approximated by a uniform distribution. In other words, in the depressed layer 12, the refractive index n(r) at a point to which the distance from the central axis L is r is approximated by n(r)=nd (a constant). Further, as shown in the portion (b) of FIG. 1, the refractive index of the cladding 13 is approximated by a uniform distribution. In other words, in the cladding 13, the refractive index n(r) at a point to which the distance from the central axis L is r is approximated by n(r)=n2 (a constant). Among a maximum refractive index n1 of the core 11, the refractive index nd of the depressed layer 12, and the refractive index n2 of the cladding 13, the relationship of nd<n2<n1 is satisfied.

In the following description, a relative refractive index difference $\Delta^+$ of the core 11 with respect to the cladding 13 is used instead of the maximum refractive index n1 of the core 11. Here, the relative refractive index difference $\Delta^+$ is an amount defined by $\Delta^+=(n1^2-n2^2)/(2n1^2)\times100[\%]$. Further, in the following description, a relative refractive index difference $\Delta^-$ of the depressed layer 12 with respect to the cladding 13 is used instead of the refractive index nd of the depressed layer 12. Here, the relative refractive index difference $\Delta^-$ is an amount defined by $\Delta^-=(nd^2-n2^2)/(2nd^2)\times100[\%]$.

The refractive index profile of the optical fiber 1 is uniquely determined from the above-described constants α, $\Delta^+$, $\Delta^-$, r1, and r2. Hereinafter, the five constants are referred to as "structural parameters" of the optical fiber 1.

The actual refractive index profile n'(r) of the optical fiber 1 may not match the ideal refractive index profile n(r) shown in the portion (b) of FIG. 1. However, for the actual refractive index profile n'(r) of the optical fiber 1, the structural parameters α, $\Delta^+$, $\Delta^-$, r1, and r2 can also be defined according to the following procedure. The actual refractive index profile n'(r) of the optical fiber 1 is accurately approximated by the ideal refractive index profile n(r) that is determined from the structural parameters α, $\Delta^+$, $\Delta^-$, r1, and r2 defined according to the following procedure.

Step 1: In the actual refractive index profile n'(r) of the optical fiber 1, an average value in a range in which the refractive index of the cladding 13 is substantially constant is obtained, and the average value is set as the refractive index n2 of the cladding 13.

Step 2: In the actual refractive index profile n'(r) of the optical fiber 1, a minimum r at which n'(r)=n2 is obtained, and this r is set as r0. In an area of 0≤r≤r0, values of n1, r1, and α included in the α power distribution $n(r)=n1[1-2\Delta^+(r/r1)^\alpha]^{1/2}$ are determined such that the actual refractive index profile n'(r) of the optical fiber 1 is best approximated (the square error thereof is minimized). In addition, r1 is set as a value of r at which n(r)=n2. These values of n1, r1, and α are set as the maximum refractive index n1 of the core 11, the radius r1 of the core 11, and the index α of the α power distribution, respectively.

Step 3: In the actual refractive index profile n'(r) of the optical fiber 1, a minimum value $n_{min}$ of n'(r) is obtained, and an average value $n_{ave}=(n_{min}+n2)/2$ between the minimum value $n_{min}$ and the refractive index n2 is obtained. In the actual refractive index profile n'(r) of the optical fiber 1, a maximum r at which $n'(r)=n_{ave}$ is obtained, and this r is set as the outer circumference radius r2 of the depressed layer 12.

Step 4: In an area of $r1 \leq r \leq r2$, the average value of the actual refractive index profile n'(r) of the optical fiber 1 is obtained, and this average value is set as the refractive index nd of the depressed layer 12. The method of obtaining the average value includes, for example, a method of taking sampling points at predetermined intervals in $r1 \leq r \leq r2$ and calculating the average value of n' (r) at each sampling point. In this case, although the predetermined interval is not particularly limited, it is, for example, 0.5 μm or a value less than 0.5 μm.

Step 5: The relative refractive index difference $\Delta^+$ of the core 11 with respect to the cladding 13 is determined according to $\Delta^+ = (n1^2 - n2^2)/(2n1^2) \times 100 [\%]$ from the refractive index n2 of the cladding 13 determined in step 1 and the maximum refractive index n1 of the core 11 determined in step 2. Further, the relative refractive index difference $\Delta^-$ of the depressed layer 12 with respect to the cladding 13 is determined according to $\Delta^- = (nd^2 - n2^2)/(2nd^2) \times 100 [\%]$ from the refractive index n2 of the cladding 13 determined in step 1 and the refractive index nd of the depressed layer 12 determined in signal step 4.

Figure 2:
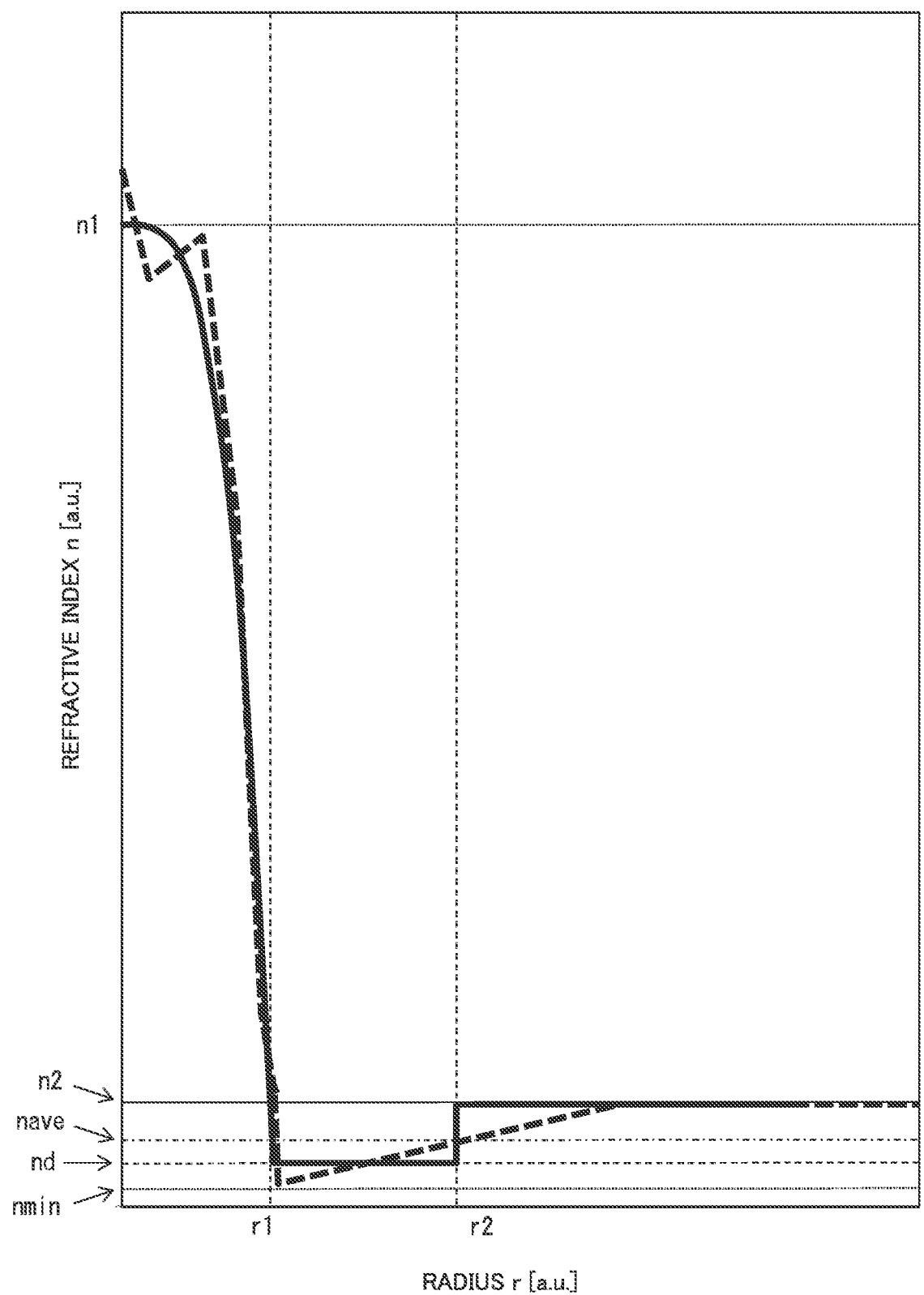
FIG. 2 is a graph showing a simulated actual refractive index profile and a graph showing an ideal refractive index profile determined according to definitions of one or more embodiments of the present invention.

A graph shown by a dotted line in FIG. 2 indicates a simulated actual refractive index profile n'(r). When the above-described procedure is applied to this refractive index profile n'(r), some structural parameters $\alpha$, $\Delta^+$, $\Delta^-$, r1, and r2 are determined. When the ideal refractive index profile n(r) having the structural parameters $\alpha$, $\Delta^+$, r1, and r2 is plotted, a graph shown by a solid line in FIG. 2 is obtained. According to FIG. 2, it can be confirmed that the actual refractive index profile n'(r) is accurately approximated by the ideal refractive index profile n(r) having the structural parameters $\alpha$, $\Delta^+$, $\Delta^-$, r1, and r2 determined according to the above procedure.

(Structural Parameters of Optical Fiber)

In the optical fiber 1 of this embodiment, it is possible that an index $\alpha$ of the refractive index profile of the core 11 satisfy the following condition (1).

$$3 \leq \alpha \leq 6 \tag{1}$$

When the index $\alpha$ is set to be too great, the zero dispersion wavelength ZDW may be less than a lower limit value (for example, 1305 nm) of the allowable range. When the index $\alpha$ is set to 6 or less, such a situation does not easily occur. On the other hand, when the index $\alpha$ is set to be too small, it is impossible or difficult to manufacture, through a vapor-phase axial deposition method (VAD method), the optical fiber 1 having a refractive index profile close to a design goal and a situation in which the zero dispersion wavelength ZDW exceeds an upper limit value (for example, 1319 nm) of the allowable range may occur. When the index $\alpha$ is set to 3 or more, such situations do not easily occur.

The VAD method is a method of manufacturing a preform, which has excellent mass productivity and economy. Further, the VAD method is known to have excellent characteristics such that (1) the process thereof is simple, (2) it is possible to continuously manufacture a preform, and (3) it is easy to manufacture a large-size preform (Reference 1: Tatsuo Izawa et. al., "Research and Development of Vapor-phase Axial Deposition method (VAD method)", [online], Japan Society for the Promotion of Science, National Institute of Informatics, [Accessed Jun. 26, 2017], Internet <URL: http://dbnst.nii.ac.jp/pro/detail/511]>). Therefore, about 60% of optical fibers for communication, which are produced worldwide, are produced through the VAD method (Reference 2: 2, 3 NTT Technical Journal, 2015. 9, Fujikura News, No. 408, 2015. 7). It is easy to manufacture a large-size preform through the VAD method because the VAD method is a manufacturing method of depositing soot in an axial direction of a preform. In contrast, it is difficult to manufacture a large-size preform through a Chemical Vapor Deposition method (CVD method) in which soot is deposited inside a hollow natural quartz tube in a radial direction.

However, in the VAD method, it is difficult to control the refractive index profile as compared with the CVD method. One cause of this is that, in the CVD method, soot is deposited and grown in the radial direction, whereas in the VAD method, soot is deposited and grown in the axial direction using one or two burners. However, when the shape and the position of a burner and the way in which a raw material and a fuel are supplied are optimized, it is possible to manufacture a preform that appropriately satisfies a specific refractive index profile (Reference 3: Katsuhiko Okubo, "Optical Fiber Technology in the ISDN Era", pp. 2-10 to 2-20, Rikogakusha Publishing Co., Ltd.). For example, in a case where the refractive index profile is an $\alpha$ power distribution, when the index $\alpha$ is 3 or more, it is possible to manufacture a preform that appropriately satisfies the refractive index profile.

In the optical fiber 1 of this embodiment, it is possible that the absolute value $|\Delta^-|$ of the relative refractive index difference $\Delta^-$ of the depressed layer 12 with respect to the cladding 13 satisfy the following condition (2), and it is further possible that the absolute value $|\Delta^-|$ satisfy the following condition (2').

$$0.01\% \leq |\Delta^-| \leq 0.05\% \tag{2}$$

$$0.01\% \leq |\Delta^-| \leq 0.03\% \tag{2'}$$

When the absolute value of the relative refractive index difference $\Delta^-$ becomes too small, a situation may occur in which the bending loss exceeds the upper limit value of the allowable range thereof. When the absolute value of the relative refractive index difference $\Delta^-$ is set to 0.01% or more, such a situation does not easily occur. On the other hand, when the absolute value of the relative refractive index difference $\Delta^-$ becomes too great, the mode field diameter decreases, and as a result, a situation may occur in which the connection loss in connection to another optical fiber exceeds the upper limit value of the allowable range thereof. When the absolute value of the relative refractive index difference $\Delta^-$ is set to 0.05% or less, the possibility of occurrence of such a situation is decreased, and when the absolute value of the relative refractive index difference $\Delta^-$ is set to 0.03% or less, the possibility of occurrence of such a situation is further decreased.

Further, in the optical fiber 1 of this embodiment, it is possible that the radius r1 of the core 11 and the outer circumference radius r2 of the depressed layer 12 be set such that a ratio r1/r2 satisfies the following condition (3), and it is further possible that the radius r1 and the outer circumference radius r2 be set such that the ratio r1/r2 satisfies the following condition (3').

$$0.2 \leq r1/r2 \leq 0.5 \tag{3}$$

$$0.25 \leq r1/r2 \leq 0.45 \tag{3'}$$

When the ratio r1/r2 becomes too small, the mode field diameter decreases, and as a result, a situation may occur in which the connection loss in connection to another optical fiber exceeds the upper limit value of the allowable range. When the ratio r1/r2 is set to 0.2 or more, the possibility of occurrence of such a situation is decreased, and when the ratio r1/r2 is set to 0.25 or more, the possibility of occurrence of such a situation is further decreased. On the other hand, when the ratio r1/r2 becomes too great, a situation may occur in which the bending loss exceeds the upper limit value of the allowable range. When the ratio r1/r2 is set to 0.5 or less, the possibility of occurrence of such a situation is decreased, and when the ratio r1/r2 is set to 0.45 or less, the possibility of occurrence of such a situation is further decreased.

It is possible that the structural parameters α, Δ⁺, Δ⁻, r1, and r2 be determined such that a cable cutoff wavelength $\lambda_{cc}$ of 22 m and the mode field diameters MFD at a wavelength of 1310 nm satisfy the following conditions (4) and (5), respectively, within a range specified by the above conditions (1), (2), and (3). Accordingly, it is possible to realize the optical fiber 1 that satisfies requirements specified in the ITU-T Recommendation G.652.

$$\lambda_{cc} \leq 1260 \text{ nm} \quad (4)$$

$$8.6 \text{ μm} \leq \text{MFD} \leq 9.5 \text{ μm} \quad (5)$$

The cutoff wavelength denotes a minimum wavelength at which a higher order mode (indicating an LP11 mode in this specification) is sufficiently attenuated. Specifically, the cutoff wavelength is a minimum wavelength at which a loss of a higher order mode becomes 19.3 dB. The cutoff wavelength includes a fiber cutoff wavelength and a cable cutoff wavelength and can be measured through, for example, a measurement method described in the ITU-T Recommendation G.650.

As described above, in the optical fiber 1 of this embodiment, the absolute value |Δ⁻| of the relative refractive index difference Δ⁻ of the depressed layer 12 with respect to the cladding 13 is set to satisfy the above condition (2), and the radius r1 of the core 11 and the outer circumference radius r2 of the depressed layer 12 are set such that the ratio r1/r2 satisfies the above condition (3), whereby both low connection loss and low bending loss are obtained. Further, in the optical fiber 1 of this embodiment, dispersion characteristics are improved by setting the refractive index profile of the core to be an α power distribution in which the index α is 6 or less. Further, in the optical fiber 1 of this embodiment, it is possible to manufacture a preform through the VAD method by setting the refractive index profile of the core to be an α power distribution in which the index α is 3 or more.

Figure 3:
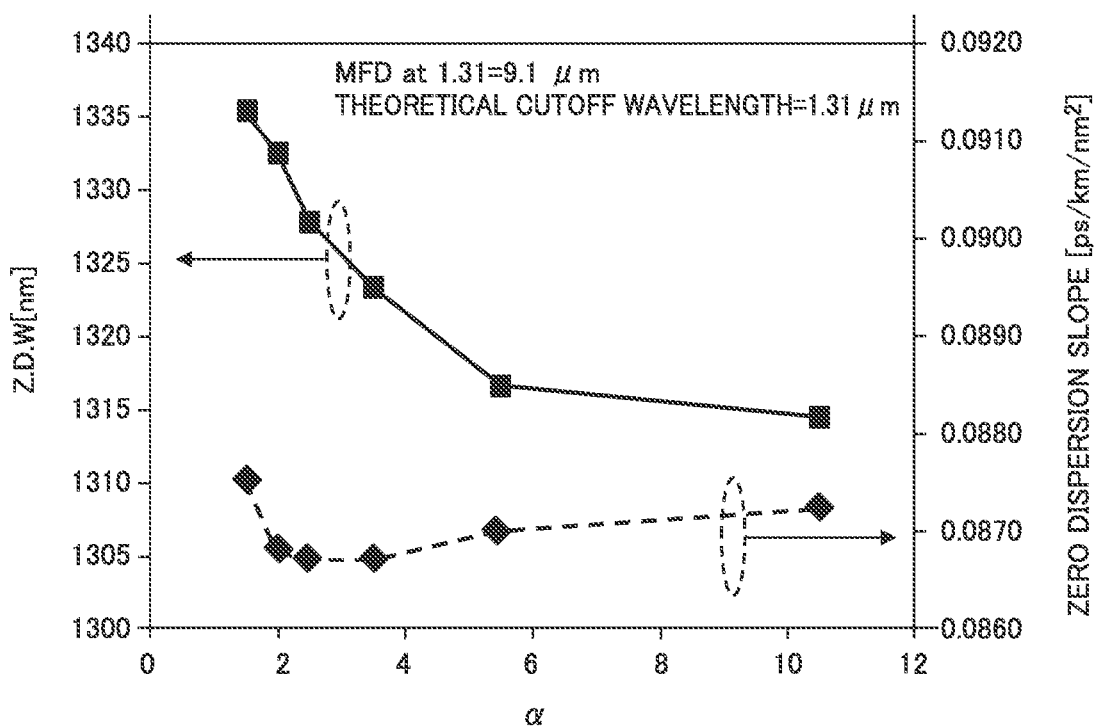
FIG. 3 is a graph indicating dependence of a zero dispersion wavelength ZDW and a zero dispersion slope on α in an optical fiber (including no depressed layer) in which the refractive index profile of a core is an α power distribution and the refractive index profile of a cladding is a uniform distribution.

For reference, a graph is shown in FIG. 3 indicating dependence of the zero dispersion wavelength ZDW and the zero dispersion slope on α when an MFD at a wavelength of 1.31 μm is 9.1 μm and a theoretical cutoff wavelength λct is 1.31 μm in an optical fiber (including no depressed layer) in which the refractive index profile of the core is an α power distribution and the refractive index profile of the cladding is a uniform distribution. Here, the theoretical cutoff wavelength λct is a theoretical minimum wavelength that cannot be propagated in a target mode. A mathematical definition of the theoretical cutoff wavelength λct is described in Reference 4 (Single Mode Fiber Optics, Jeunhomme, pp. 39-44, Marcel Dekker, New York, 1990). It can be confirmed from FIG. 3 that the zero dispersion wavelength ZDW decreases as the index α increases. Further, it can be confirmed from FIG. 3 that the zero dispersion slope is substantially constant in a range in which the index α is 1 or more and 11 or less. These properties are similarly established even when the relative refractive index difference Δ⁻ is set to satisfy the above condition (2).

Figure 4:
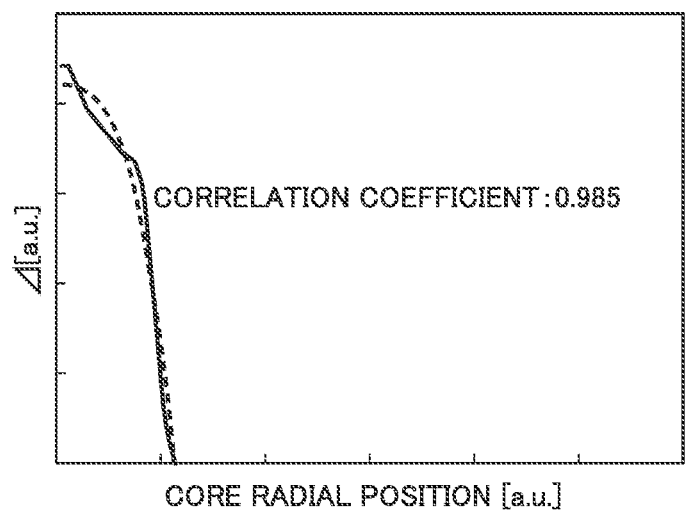
FIG. 4 is a graph showing a refractive index profile of an optical fiber (including no depressed layer) manufactured through a VAD method with a design goal in which the refractive index profile of a core is an α power distribution and the refractive index profile of a cladding is a uniform distribution, together with the refractive index profile that is the design goal.
Figure 4:
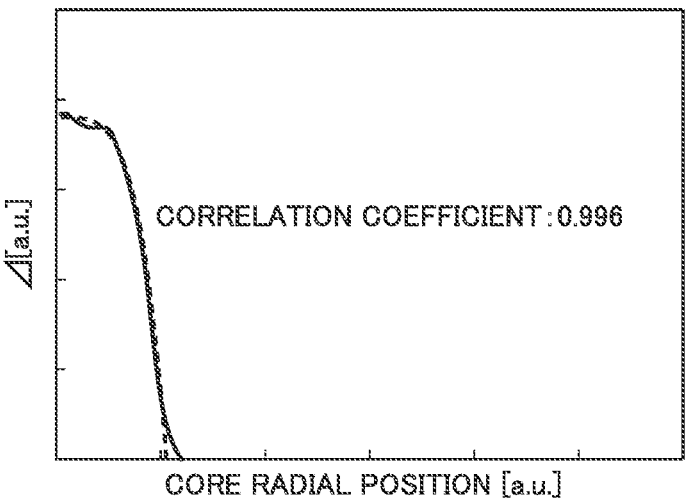
Figure 4:
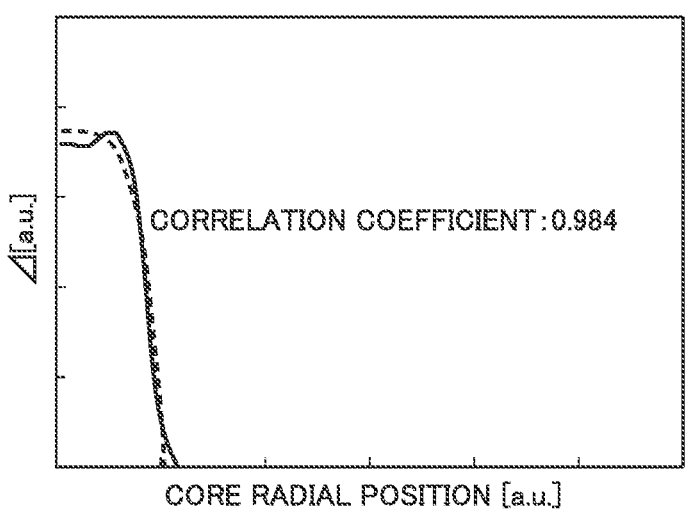

Further, for reference, a graph is shown in FIG. 4 showing a refractive index profile of an optical fiber manufactured through the VAD method with a design goal in which the refractive index profile of the core is an α power distribution and the refractive index profile of the cladding is a uniform distribution, together with the refractive index profile that is the design goal. The portion (a) of FIG. 4 indicates a refractive index profile when the index α is about 3, the portion (b) thereof indicates a refractive index profile when the index α is about 4, and the portion (c) thereof indicates a refractive index profile when the index α is about 5. It can be confirmed from FIG. 4 that when the index α is 3 or more, an optical fiber having a refractive index profile close to the design goal can be manufactured through the VAD method.

Practical Example

Practical examples of the optical fiber 1 of this embodiment are described with reference to Tables 1 and 2. In Table 1, Nos. 1 to 5 indicate comparative examples in which α<3, and Nos. 6 to 19 indicate practical examples in which 3≤α≤6. In Table 2, Nos. 20 to 39 indicate practical examples in which 3≤α≤6, and Nos. 40 to 46 indicate comparative examples in which α>6. In both of the practical examples and the comparative examples, the relative refractive index difference Δ⁺ is set to satisfy 0.30%≤Δ⁺≤0.45%, the relative refractive index difference Δ⁻ is set to satisfy the above condition (2), and the radius r1 and the outer circumference radius r2 are set to satisfy the above condition (3).

The MAC value shown in Tables 1 and 2 is a value obtained by dividing the mode field diameter MFD at a wavelength of 1310 nm by the cable cutoff wavelength $\lambda_{cc}$.

TABLE 1

| No. | α | Δ+ [%] | Δ− [%] | r1/r2 | r1 [μm] | r2 [μm] | MFD at 1.31 [μm] | λ cc [μm] | MAC | ZDW [μm] | ZERO DISPERSION SLOPE [ps/km/nm²] | BENDING LOSS at 1.55 R = 10 mm [dB/turn] | BENDING LOSS at 1.55 R = 15 mm [dB/10turn] | BENDING LOSS at 1.625 R = 10 mm [dB/turn] | BENDING LOSS at 1.625 R = 15 mm [dB/10turn] |
|---|---|---|---|---|---|---|---|---|---|---|---|---|---|---|---|
| 1 | 2.5 | 0.42 | −0.03 | 0.3 | 5.85 | 19.50 | 8.96 | 1.255 | 7.14 | 1.311 | 0.088 | 0.22 | 0.015 | 0.72 | 0.126 |
| 2 | 2.5 | 0.4 | −0.02 | 0.3 | 5.78 | 19.25 | 9.08 | 1.216 | 7.47 | 1.314 | 0.088 | 0.26 | 0.027 | 0.82 | 0.171 |
| 3 | 2.5 | 0.39 | −0.02 | 0.4 | 5.90 | 14.75 | 9.23 | 1.220 | 7.57 | 1.312 | 0.089 | 0.30 | 0.031 | 0.91 | 0.182 |
| 4 | 2.5 | 0.39 | −0.03 | 0.3 | 5.85 | 19.50 | 9.16 | 1.203 | 7.61 | 1.311 | 0.088 | 0.25 | 0.031 | 0.78 | 0.184 |
| 5 | 2.5 | 0.38 | −0.02 | 0.5 | 5.75 | 11.50 | 9.22 | 1.171 | 7.87 | 1.315 | 0.087 | 0.41 | 0.049 | 0.69 | 0.233 |
| 6 | 3.5 | 0.38 | −0.04 | 0.5 | 5.65 | 11.30 | 9.12 | 1.224 | 7.45 | 1.305 | 0.091 | 0.27 | 0.025 | 0.85 | 0.161 |
| 7 | 3.5 | 0.395 | −0.04 | 0.5 | 5.56 | 11.11 | 8.96 | 1.223 | 7.33 | 1.306 | 0.089 | 0.26 | 0.020 | 0.81 | 0.143 |
| 8 | 3.5 | 0.4 | −0.02 | 0.5 | 5.35 | 10.70 | 8.87 | 1.220 | 7.27 | 1.313 | 0.087 | 0.27 | 0.023 | 0.85 | 0.153 |
| 9 | 3.5 | 0.385 | −0.01 | 0.5 | 5.56 | 11.11 | 9.15 | 1.206 | 7.59 | 1.311 | 0.088 | 0.29 | 0.025 | 0.89 | 0.157 |
| 10 | 3.5 | 0.36 | −0.04 | 0.4 | 5.65 | 13.89 | 9.2 | 1.155 | 7.97 | 1.307 | 0.089 | 0.33 | 0.046 | 0.99 | 0.226 |
| 11 | 3.5 | 0.375 | −0.03 | 0.4 | 5.55 | 13.89 | 9.13 | 1.202 | 7.60 | 1.308 | 0.088 | 0.28 | 0.031 | 0.87 | 0.182 |

TABLE 1-continued

| No. | α | Δ+ [%] | Δ− [%] | r1/r2 | r1 [μm] | r2 [μm] | MFD at 1.31 [μm] | λ cc [μm] | MAC | ZDW [μm] | ZERO DISPERSION SLOPE [ps/km/nm²] | BENDING LOSS at 1.55 R = 10 mm [dB/turn] | BENDING LOSS at 1.55 R = 15 mm [dB/10turn] | BENDING LOSS at 1.625 R = 10 mm [dB/turn] | BENDING LOSS at 1.625 R = 15 mm [dB/10turn] |
|---|---|---|---|---|---|---|---|---|---|---|---|---|---|---|---|
| 12 | 3.5 | 0.375 | −0.02 | 0.4 | 5.40 | 13.50 | 9.08 | 1.201 | 7.56 | 1.312 | 0.087 | 0.31 | 0.038 | 0.96 | 0.207 |
| 13 | 3.5 | 0.385 | −0.03 | 0.3 | 5.55 | 18.51 | 9.06 | 1.222 | 7.41 | 1.308 | 0.089 | 0.24 | 0.022 | 0.75 | 0.152 |
| 14 | 3.5 | 0.375 | −0.02 | 0.3 | 5.48 | 18.25 | 9.12 | 1.195 | 7.63 | 1.311 | 0.088 | 0.28 | 0.033 | 0.85 | 0.190 |
| 15 | 3.5 | 0.38 | −0.02 | 0.3 | 5.52 | 18.40 | 9.09 | 1.203 | 7.56 | 1.311 | 0.087 | 0.27 | 0.027 | 0.82 | 0.169 |
| 16 | 3.5 | 0.385 | −0.01 | 0.3 | 5.57 | 18.55 | 9.15 | 1.213 | 7.55 | 1.310 | 0.088 | 0.27 | 0.023 | 0.84 | 0.154 |
| 17 | 3.5 | 0.37 | −0.04 | 0.2 | 5.55 | 27.75 | 9.12 | 1.245 | 7.33 | 1.307 | 0.088 | 0.21 | 0.026 | 0.67 | 0.172 |
| 18 | 3.5 | 0.38 | −0.02 | 0.2 | 5.40 | 27.00 | 9.04 | 1.215 | 7.44 | 1.312 | 0.087 | 0.24 | 0.029 | 0.74 | 0.178 |
| 19 | 3.5 | 0.39 | −0.01 | 0.2 | 5.55 | 27.76 | 9.11 | 1.233 | 7.39 | 1.310 | 0.088 | 0.25 | 0.020 | 0.78 | 0.141 |

TABLE 2

| No. | α | Δ+ [%] | Δ− [%] | r1/r2 | r1 [μm] | r2 [μm] | MFD at 1.31 [μm] | λ cc [μm] | MAC | ZDW [μm] | ZERO DISPERSION SLOPE [ps/km/nm²] | BENDING LOSS at 1.55 R = 10 mm [dB/turn] | BENDING LOSS at 1.55 R = 15 mm [dB/10turn] | BENDING LOSS at 1.625 R = 10 mm [dB/turn] | BENDING LOSS at 1.625 R = 15 mm [dB/10turn] |
|---|---|---|---|---|---|---|---|---|---|---|---|---|---|---|---|
| 20 | 4.8 | 0.365 | −0.04 | 0.5 | 5.31 | 10.63 | 9.06 | 1.181 | 7.67 | 1.305 | 0.089 | 0.29 | 0.032 | 0.91 | 0.188 |
| 21 | 4.8 | 0.38 | −0.015 | 0.45 | 4.95 | 11.00 | 8.98 | 1.226 | 7.32 | 1.310 | 0.088 | 0.28 | 0.026 | 0.89 | 0.163 |
| 22 | 4.8 | 0.385 | −0.04 | 0.4 | 5.25 | 13.13 | 8.88 | 1.202 | 7.39 | 1.305 | 0.088 | 0.25 | 0.020 | 0.78 | 0.146 |
| 23 | 4.8 | 0.36 | −0.04 | 0.4 | 5.30 | 13.25 | 9.08 | 1.181 | 7.69 | 1.305 | 0.088 | 0.29 | 0.037 | 0.88 | 0.205 |
| 24 | 4.8 | 0.37 | −0.03 | 0.4 | 5.20 | 13.00 | 8.99 | 1.196 | 7.52 | 1.308 | 0.087 | 0.28 | 0.032 | 0.88 | 0.188 |
| 25 | 4.8 | 0.37 | −0.02 | 0.4 | 5.30 | 13.25 | 9.11 | 1.222 | 7.45 | 1.307 | 0.087 | 0.28 | 0.027 | 0.88 | 0.169 |
| 26 | 4.8 | 0.38 | −0.03 | 0.3 | 5.22 | 17.40 | 8.96 | 1.202 | 7.45 | 1.307 | 0.088 | 0.24 | 0.022 | 0.76 | 0.153 |
| 27 | 4.8 | 0.377 | −0.02 | 0.3 | 5.28 | 17.60 | 9.05 | 1.226 | 7.38 | 1.307 | 0.088 | 0.26 | 0.022 | 0.79 | 0.152 |
| 28 | 4.3 | 0.371 | −0.015 | 0.3 | 5.21 | 17.35 | 9.06 | 1.214 | 7.46 | 1.310 | 0.087 | 0.28 | 0.029 | 0.87 | 0.177 |
| 29 | 4.8 | 0.363 | −0.015 | 0.3 | 5.37 | 17.90 | 9.24 | 1.234 | 7.48 | 1.307 | 0.088 | 0.28 | 0.028 | 0.87 | 0.172 |
| 30 | 4.8 | 0.34 | −0.015 | 0.3 | 5.33 | 17.75 | 9.39 | 1.182 | 7.94 | 1.309 | 0.086 | 0.44 | 0.053 | 1.27 | 0.235 |
| 31 | 4.8 | 0.369 | −0.04 | 0.2 | 5.1 | 25.5 | 8.88 | 1.196 | 7.42 | 1.308 | 0.087 | 0.21 | 0.031 | 0.68 | 0.190 |
| 32 | 4.8 | 0.375 | −0.02 | 0.2 | 5.3 | 26.5 | 9.07 | 1.254 | 7.23 | 1.307 | 0.087 | 0.23 | 0.020 | 0.72 | 0.145 |
| 33 | 6 | 0.37 | −0.02 | 0.3 | 5.09 | 16.95 | 9.01 | 1.218 | 7.40 | 1.307 | 0.087 | 0.26 | 0.025 | 0.82 | 0.164 |
| 34 | 6 | 0.365 | −0.02 | 0.4 | 5.00 | 12.50 | 8.99 | 1.183 | 7.60 | 1.310 | 0.087 | 0.30 | 0.034 | 0.93 | 0.197 |
| 35 | 6 | 0.385 | −0.03 | 0.4 | 5.00 | 12.50 | 8.80 | 1.193 | 7.39 | 1.307 | 0.087 | 0.26 | 0.021 | 0.80 | 0.148 |
| 36 | 6 | 0.373 | −0.01 | 0.4 | 5.06 | 12.65 | 9.03 | 1.190 | 7.59 | 1.309 | 0.088 | 0.29 | 0.025 | 0.89 | 0.162 |
| 37 | 6 | 0.376 | −0.02 | 0.2 | 5 | 25 | 8.91 | 1.219 | 7.31 | 1.309 | 0.087 | 0.23 | 0.022 | 0.73 | 0.154 |
| 38 | 6 | 0.355 | −0.02 | 0.3 | 5.25 | 17.5 | 9.24 | 1.22 | 7.57 | 1.305 | 0.088 | 0.28 | 0.030 | 0.85 | 0.179 |
| 39 | 6 | 0.34 | −0.02 | 0.3 | 5.25 | 17.5 | 9.36 | 1.19 | 7.87 | 1.308 | 0.088 | 0.33 | 0.045 | 0.98 | 0.225 |
| 40 | 10 | 0.355 | −0.02 | 0.3 | 4.85 | 16.5 | 9.14 | 1.22 | 7.49 | 1.304 | 0.088 | 0.27 | 0.027 | 0.85 | 0.170 |
| 41 | 10 | 0.34 | −0.01 | 0.2 | 5 | 25 | 9.36 | 1.243 | 7.53 | 1.304 | 0.088 | 0.29 | 0.036 | 0.88 | 0.200 |
| 42 | 10 | 0.345 | −0.03 | 0.4 | 5 | 12.5 | 9.19 | 1.191 | 7.72 | 1.302 | 0.089 | 0.30 | 0.035 | 0.92 | 0.199 |
| 43 | 10 | 0.365 | −0.02 | 0.4 | 4.7 | 11.75 | 8.88 | 1.188 | 7.47 | 1.310 | 0.086 | 0.30 | 0.033 | 0.93 | 0.191 |
| 44 | 10 | 0.38 | −0.02 | 0.3 | 4.8 | 16 | 8.85 | 1.245 | 7.11 | 1.306 | 0.087 | 0.25 | 0.018 | 0.79 | 0.138 |
| 45 | 10 | 0.335 | −0.02 | 0.3 | 4.95 | 16.5 | 9.33 | 1.193 | 7.82 | 1.304 | 0.089 | 0.43 | 0.053 | 0.69 | 0.233 |
| 46 | 10 | 0.335 | −0.02 | 0.3 | 4.875 | 16.25 | 9.23 | 1.173 | 7.87 | 1.307 | 0.088 | 0.42 | 0.052 | 1.23 | 0.233 |

The structural parameters α, Δ+, Δ−, r1, and r2 defined according to the above-described procedure, and characteristic values are shown in Tables 1 and 2.

According to Table 1, it can be understood that the following characteristics (a) to (d) are obtained in all of the practical examples. In contrast, according to Table 1, since α=2.5 in all of the comparative examples Nos. 1 to 5, it is impossible or difficult to manufacture an optical fiber through the VAD method. Further, according to Table 2, in some comparative examples Nos. 40, 41, 42, and 45, since the zero dispersion wavelength ZDW is less than 1305 nm, required characteristics are not satisfied.

(a) The zero dispersion wavelength ZDW is 1305 nm or more and 1313 nm or less, and satisfies a requirement (1300 nm or more and 1324 nm or less) specified in the ITU-TG.652 with a margin of 5 nm with respect to the lower limit value and with a margin of 13 nm with respect to the upper limit value.

(b) The cable cutoff wavelength $\lambda_{cc}$ is 1245 nm or less, and satisfies a requirement (1260 nm or less) specified in the ITU-T Recommendation G.652 with a margin of 15 nm.

(c) The mode field diameter MFD at a wavelength of 1310 nm is 8.8 μm or more and 9.4 μm or less, and satisfies a requirement (8.6 μm or more and 9.5 μm or less) specified in the ITU-T Recommendation G.652 with a margin of 2 μm with respect to the lower limit value and with a margin of 1 μm with respect to the upper limit value.

(d) The bending loss satisfies the following requirements specified in the ITU-T Recommendation G.657.A1.

An increase in loss at a wavelength of 1550 nm when the optical fiber is wound around a cylindrical mandrel having a radius of 10 mm is less than 0.75 dB/turn.

An increase in loss at a wavelength of 1625 nm when the optical fiber is wound around a cylindrical mandrel having a radius of 10 mm is less than 1.5 dB/turn.

An increase in loss at a wavelength of 1550 nm when the optical fiber is wound around a cylindrical mandrel having a radius of 15 mm is less than 0.25 dB/10 turn.

An increase in loss at a wavelength of 1625 nm when the optical fiber is wound around a cylindrical mandrel having a radius of 15 mm is less than 1.0 dB/10 turn.

In addition, according to Table 1, it is understood that some practical examples have the following characteristic (a') instead of the above characteristic (a).

(a') The zero dispersion wavelength ZDW is 1307 nm or more, and satisfies the requirement specified in the ITU-TG.652 with a margin of 7 nm with respect to the lower limit value.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber, comprising:
   a core;
   a depressed layer surrounding the core; and
   a cladding surrounding the depressed layer,
   wherein:
   a refractive index profile of the core is an $\alpha$ power distribution in which an index $\alpha$ is 3.5 or more and 6 or less,
   a relative refractive index difference $\Delta-$ of the depressed layer with respect to the cladding is set such that an absolute value $|\Delta-|$ thereof is 0.01% or more and 0.04% or less,
   a radius r1 of the core and an outer circumference radius r2 of the depressed layer are set such that a ratio r1/r2 thereof is 0.3 or more and 0.5 or less,
   the outer circumference radius r2 is 18.55 µm or less,
   a cable cutoff wavelength $\lambda$cc of 22 m is 1260 nm or less, and
   a mode field diameter MFD at a wavelength of 1310 nm is 8.6 µm or more and 9.5 µm or less.

2. The optical fiber according to claim 1, wherein the relative refractive index difference $\Delta-$ is set such that the absolute value $|\Delta-|$ thereof is 0.01% or more and 0.03% or less.

3. The optical fiber according to claim 1, wherein the radius r1 and the outer circumference radius r2 are set such that the ratio r1/r2 thereof is 0.3 or more and 0.45 or less.

4. The optical fiber according to claim 1, wherein a relative refractive index difference $\Delta+$ of the core with respect to the cladding is set to be 0.30% or more and 0.45% or less.

5. The optical fiber according to claim 1, wherein a zero dispersion wavelength ZDW is 1305 nm or more.

6. The optical fiber according to claim 5, wherein the zero dispersion wavelength ZDW is 1307 nm or more.

7. The optical fiber according to claim 1, wherein the mode field diameter MFD is 8.8 µm or more and 9.4 µm or less.

8. The optical fiber according to claim 1, wherein
   (1) an increase in loss at a wavelength of 1550 nm when the optical fiber is wound around a cylindrical mandrel having a radius of 10 mm is less than 0.75 dB/turn, (2) an increase in loss at a wavelength of 1625 nm when the optical fiber is wound around a cylindrical mandrel having a radius of 10 mm is less than 1.5 dB/turn, (3) an increase in loss at a wavelength of 1550 nm when the optical fiber is wound around a cylindrical mandrel having a radius of 15 mm is less than 0.25 dB/10 turn, and (4) an increase in loss at a wavelength of 1625 nm when the optical fiber is wound around a cylindrical mandrel having a radius of 15 mm is less than 1.0 dB/10 turn.

9. A method of manufacturing the optical fiber according to claim 1, the method comprising the step of:
   manufacturing a preform for the optical fiber through a vapor-phase axial deposition (VAD) method.

10. The optical fiber according to claim 1, wherein an increase in loss at a wavelength of 1625 nm when the optical fiber is wound around a cylindrical mandrel having a radius of 15 mm is less than 1.0 dB/10 turn.

* * * * *